United States Patent [19]

Hokenson

[11] Patent Number: 5,046,473

[45] Date of Patent: Sep. 10, 1991

[54] AUTOMATIC AIR INTAKE TEMPERATURE REGULATOR APPARATUS AND METHOD

[75] Inventor: Larry D. Hokenson, Isanti, Minn.

[73] Assignee: Onan Corporation, Minneapolis, Minn.

[21] Appl. No.: 510,949

[22] Filed: Apr. 19, 1990

[51] Int. Cl.$^5$ ............................................. F02M 31/00
[52] U.S. Cl. ..................................... 123/556; 123/552
[58] Field of Search ............................. 123/556, 552

[56] References Cited

U.S. PATENT DOCUMENTS

| | | |
|---|---|---|
| 2,080,272 | 5/1937 | Hollman . |
| 2,781,032 | 2/1957 | Sebok et al. ........................ 123/556 |
| 3,092,142 | 6/1963 | Willson . |
| 3,513,817 | 5/1970 | Kearsley . |
| 3,757,752 | 9/1973 | Holker . |
| 3,913,544 | 10/1975 | Fyie ..................................... 123/556 |
| 3,974,808 | 8/1976 | Heitert ................................. 123/556 |
| 4,144,857 | 3/1979 | Bendig et al. ........................ 123/556 |
| 4,161,930 | 7/1979 | Bendig et al. ........................ 123/556 |
| 4,175,524 | 11/1979 | Coddington ........................ 123/556 |
| 4,206,732 | 6/1980 | Ludwig . |
| 4,231,343 | 11/1980 | Alf et al. .............................. 123/556 |
| 4,244,343 | 1/1981 | Yamaguchi et al. ................ 123/556 |
| 4,249,500 | 2/1981 | Behrendt et al. .................... 123/556 |
| 4,430,981 | 2/1984 | Thomas et al. . |
| 4,526,156 | 7/1985 | Briche ................................. 123/550 |
| 4,565,176 | 1/1986 | Alf et al. .............................. 123/556 |
| 4,632,084 | 12/1986 | Eriksson ............................. 123/556 |
| 4,846,136 | 7/1989 | Phillips . |

OTHER PUBLICATIONS

Onan Corp. Parts Manual, "BGE/BGEL Emerald I Gen Set, RV Electric Generating Set", pp. 12 & 13, dated 12/87; (Exhibit B: parts manual and prod. drugs), with Accompanying Production Drawings.
"Cover Air Inlet", Drawing No. 145-0561 rev. D3, Sheet 1 of 1, Original Drawing Date 3/12/84.
"Rod, Air Inlet", Drawing No. 145-0562, rev. C2, Sheet 1 of 1, Original Drawing Date 3/14/84.
"Housing Air Cleaner", Drawing No. 140-1894, rev. C1, Sheet 1 of 1, Original Drawing Date 4/14/83.
General Motors Product Facts Publication, "AC Air Cleaners Passenger Car and Light Duty Truck"; 3 pages dated May, 1986 (Exhibit A).

Primary Examiner—Andrew M. Dolinar
Assistant Examiner—M. Macy
Attorney, Agent, or Firm—Merchant, Gould, Smith, Edell, Welter & Schmidt

[57] ABSTRACT

An automatic air intake temperature regulator (10) for regulating the temperature of air entering an engine (12) by varying amounts of ambient air and preheated air entering the engine includes a movable shutter (22). The shutter (22) is movable between a first position wherein the shutter closes an ambient air inlet (20) and opens a preheated air inlet (18), and a second position wherein the shutter (22) closes the preheated air inlet (18) and opens the ambient air inlet (20). The regulator (10) further includes biasing structure (48) for biasing the shutter (22) toward the first position. The regulator further includes temperature responsive structure (50) for sensing temperature of the ambient air and urging the shutter (22) toward the second position as the ambient air temperature increases.

22 Claims, 4 Drawing Sheets

AUTOMATIC AIR INTAKE TEMPERATURE REGULATOR APPARATUS AND METHOD

BACKGROUND OF THE INVENTION

1. Technical Field

This invention relates to an automatic air intake temperature regulator apparatus and method for regulating the temperature of air entering an engine by varying the amounts of ambient and preheated air entering the engine.

2. Description of Prior Art

The air entering an internal combustion engine is often preheated to improve engine performance and eliminate carburetor icing when operating the engine in cold ambients. To further improve engine performance, it is sometimes necessary to regulate the temperature of the air entering the engine as the ambient conditions change. One common method of regulating temperature is to regulate amounts of ambient air and preheated air entering the engine.

Some prior regulator devices which regulate the air intake temperature are manually controlled. For example, such regulator devices have been used on generator sets which provide an auxiliary power source in numerous applications such as recreational vehicles, ambulances, etc. One problem with such regulator devices is that there is often a two position switch controlling the amounts of preheated air and ambient air entering the engine. The switch must be manually moved as the temperature of the ambient air changes. Failure to properly move the switch can cause problems affecting engine performance. If the air entering the engine is too cold, the throttle plate may freeze into position (carburetor icing) and the fuel may not likely mix properly with the air. If the air entering the engine is too hot, the engine may lose power.

Other regulator devices automatically regulate the temperature of air entering the engine. In these devices, a shutter may be employed to automatically regulate the amounts of ambient and preheated air which enters the engine. The temperature may further be regulated by mixing varying amounts of ambient air with preheated air with a variably positionable shutter. In some prior devices, the shutter is positioned by a temperature sensing device mounted such that it measures the downstream temperature of the mixed air entering the engine. One problem encountered with these types of devices is that it is difficult to mount the temperature sensing device in the downstream airflow and it may require a complex linkage connecting the temperature sensing device back to the shutter. Furthermore, the air in the downstream air flow includes a moving mixture of ambient air and preheated air. Care must be taken to assure that the temperature sensing device accurately measures the temperature of t e air in this mixed, moving state. Examples of prior art regulator devices can be found in U.S. Pat. Nos. 4,632,084; 4,565,176; and 4,526,156.

It is clear that there has long existed an unfilled need in the prior art for an air intake temperature regulator that automatically and variably regulates temperature, and further permits easy mounting of the temperature sensing device and allows accurate sensing of temperature to more easily regulate the temperature of the air entering the engine. The present invention solves these and other problems associated with the prior art.

SUMMARY OF THE INVENTION

This invention relates to an automatic air intake temperature regulator for regulating the temperature of air entering an internal combustion engine. The regulator has a housing with an ambient air inlet to an interior of the housing. The ambient air inlet is connectable to a source of ambient air. The housing also has a preheated air inlet to the interior of the housing. The preheated air inlet is connectable to a source of preheated air. The housing further has an air outlet from the interior of the housing to the engine. The air intake temperature regulator has a shutter which is pivotally mounted to the housing. The shutter is movable between two positions wherein the shutter closes the ambient air inlet and opens the preheated air inlet when in a first position. The shutter closes the preheated air inlet and opens the ambient air inlet when in a second position. The regulator has biasing structure for biasing the shutter toward the first position to open a preheated air inlet. The regulator further has temperature responsive structure for only sensing temperature of the ambient air on an exterior of the housing. The temperature responsive structure urges the shutter toward the second position to open the ambient air inlet as the ambient air temperature sensed increases. This invention also relates to an air flow regulating device that is mountable to an engine for regulating temperature of the air entering the engine. The engine is provided with a preheated air inlet which is attachable to a source of preheated air. The engine is also provided with an ambient air inlet which is attachable to a source of ambient air. The air flow regulating device has a shutter which is pivotally mounted to the engine. The shutter is movable between two positions wherein the shutter closes the ambient air inlet and opens the preheated air inlet when in a first position. The shutter closes the preheated air inlet and opens the ambient air inlet when in a second position. The air flow regulating device has biasing structure for biasing the shutter toward the ambient air inlet. The air flow regulating device also has temperature responsive structure which responds only to changes in ambient air temperature. The temperature responsive structure urges the shutter toward the preheated air inlet as ambient temperature increases.

This invention further relates to an automatic air intake regulator assembly that is mountable to an air filter assembly having an air inlet and an air outlet. The regulator assembly has a plate which is mountable to the air filter assembly. The plate has a preheated air inlet which is attachable to a source of preheated air. The plate further has an ambient air inlet which is attachable to a source of ambient air. The plate cooperates with the air filter assembly to form a passageway connecting the preheated air inlet and the ambient air inlet to the air inlet of the air filter assembly. The regulator assembly has a shutter pivotally mounted to the plate. The shutter closes the ambient air inlet and opens the preheated air inlet when in a first position. The shutter closes the preheated air inlet and opens the ambient air inlet when in a second position. The regulator assembly has biasing structure mounted on the plate for biasing the shutter toward the first position. The regulator assembly further has temperature responsive structure mounted on the plate for urging the shutter toward the second position as ambient temperature increases.

This invention also relates to a method for regulating temperature of air entering an internal combustion engine, which includes providing a source of ambient air and a source of preheated air to an interior of an engine, sensing the temperature of the ambient air exterior of the engine, and positioning a shutter to control air flow to the engine from the ambient air source and from the preheated air source based only on the ambient air temperature sensed.

These and various other advantages and features of novelty which characterize the invention are pointed out with particularity in the claims annexed hereto and forming a part hereof. However, for a better understanding of the invention and its advantages, reference should be made to the accompanying drawings and descriptive matter, which form a further part hereof, and in which there is illustrated and described preferred embodiment of the invention.

BRIEF DESCRIPTION OF THE DRAWINGS

In the drawings, wherein like reference numerals generally indicate corresponding parts throughout the several views.

DETAILED DESCRIPTION OF THE PREFERRED EMBODIMENT

Figure 1:
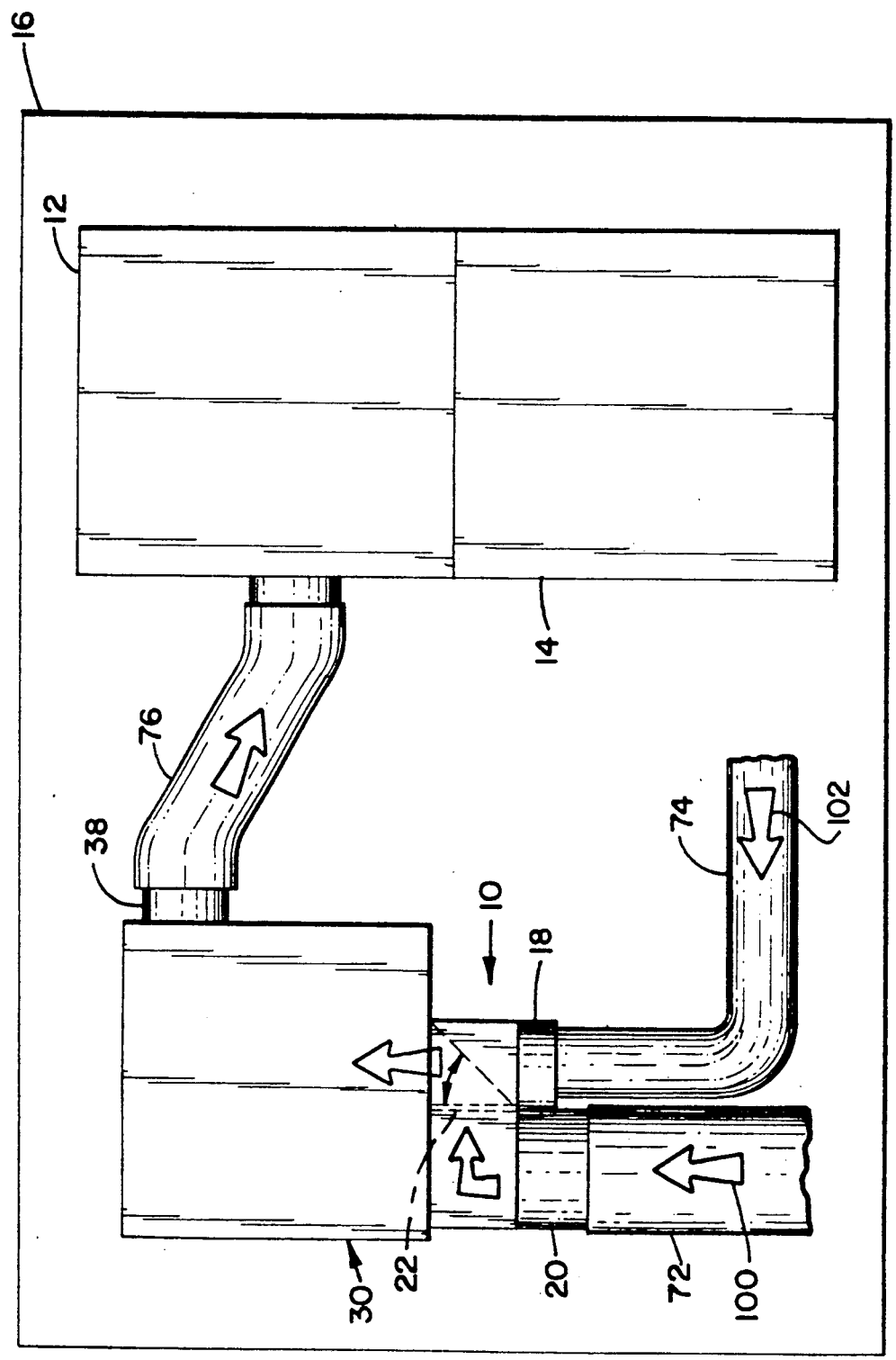
FIG. 1 is a schematic view of an automatic air intake temperature regulator mounted to a generator set which includes an internal combustion engine and a generator, arrows being added to illustrate the airflow path through the regulator to the engine.

Referring now to FIG. 1, the schematic view shows an embodiment of an automatic air intake temperature regulator 10 in accordance with the principles of the present invention mounted to an internal combustion engine 12 to regulate the flow of preheated air and ambient air supplied to the engine as intake air. The intake air is used by the engine 12 during the combustion process. The arrows represent the air flow path from a source of preheated air and a source of ambient air through the regulator 10 to the engine 12. The preheated air source supplied to the regulator 10 preheated air, represented by arrow 102, which has been heated by passing the air over a portion of the engine 12 which is warmer than ambient air temperature. Typically, this warm portion is an area adjacent to an exhaust manifold (not shown) of the engine. The preheated air enters the regulator 10 through a preheated air inlet 18. The ambient air source supplies to the regulator 10 ambient air, represented by arrow 100, which at ambient temperature. The ambient air enters the regulator 10 through an ambient air inlet 20. The regulator 10 regulates temperature with a move e shutter 22 that regulates the amounts of preheated air and ambient air which enter the regulator. Air exits the regulator through an air outlet 38 and travels through a connector 76 to the engine 12.

As illustrated in the schematic view of FIG. 1, the air intake temperature regulator 10 may be employed in a generator set 16 wherein the internal combustion engine 12 is used to power a generator 14 for generating electricity. In a basic generator set, the engine has at least one piston which is connected through a connecting rod to a rotatable crankshaft (the basic parts of the generator set are not shown). The generator has a rotor mounted on a generator shaft. The generator shaft and the rotor are rotatably mounted to a generator housing. Mounted within the generator housing is a stator. The crankshaft drives the generator shaft which rotates the rotor relative to the stator. Relative motion of the rotor and the stator generates electric current. The engine is usually provided with a speed governor for regulating the speed of the engine and the rotation of the rotor. The speed governor maintains a constant speed of the rotor under various load conditions. The rotor speed is regulated to prevent damage to appliances powered by the generator. The appliances could be damaged by changes in the electric current output from the generator that would occur if the rotor rotation speed did not remain relatively constant.

Referring now to FIGS. 2 through 5, which illustrate the preferred embodiment, the automatic air intake temperature regulator 10 is mounted on a housing 30 with the preheated air inlet 18 and ambient air inlet 20 entering into an interior of the housing 30. The shutter 22 is pivotally mounted to the housing 30 in an interior of the housing 30 adjacent to the preheated air inlet 18 and the ambient air inlet 20 at an upstream end of the housing 30. The air output 38 exists from the interior of the housing 30 at a downstream end of the housing and enters the carburetor of the engine 12.

The housing 30 typically contains an air filter element (not shown) downstream from the shutter 22 and upstream form the air output 38. The air filter is provided for filtering particulate matter from the air supplied to the engine. One type of air filter that may be used is one having a hollow cylindrical shape. The air filter typically has a pleated paper inner portion and a washable foam wrapper surrounding the pleated paper inner portion. The foam wrapper filters the larger particles and the pleated paper filters the finer particles. The air filter is mounted in the interior of the housing 30 wherein the air passing through the housing passes through the outer surface of the element toward the inner surface. The filtered air flows from the interior of the element and out the housing through the air outlet 38 to the engine 12. It will be appreciated that providing an air filter in the housing is optional, but if one is provided, it is not limited to the type described above.

Figure 3:
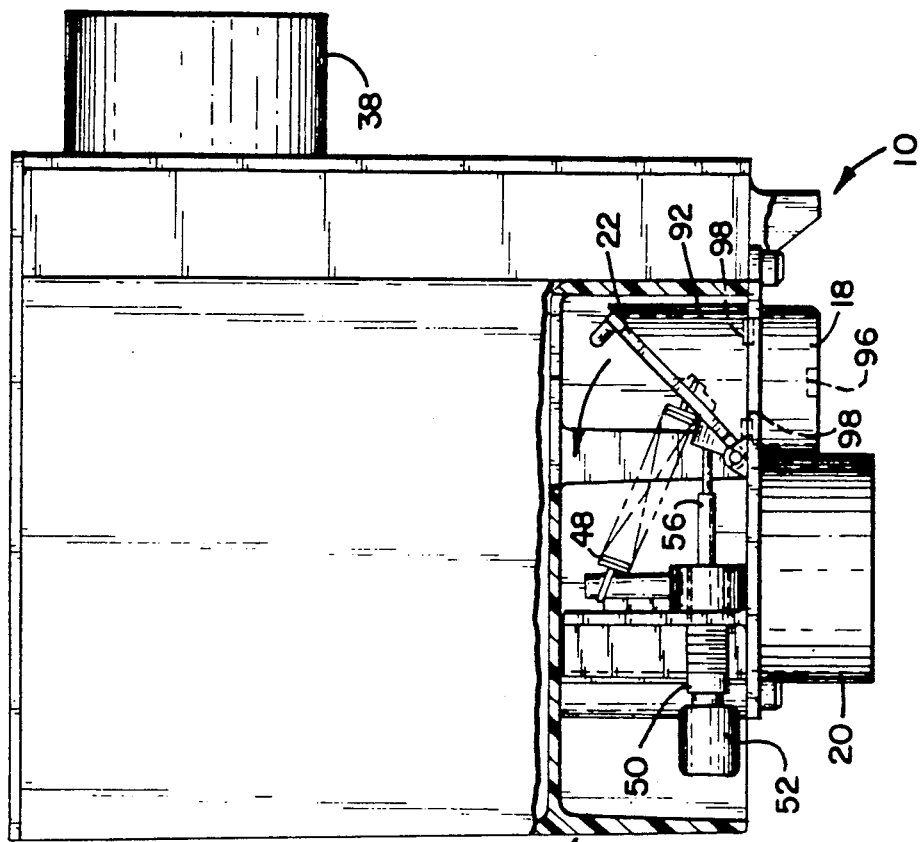
FIG. 3 is a top view of the air intake temperature regulator shown in FIG. 2 with a portion of the air filter housing removed and showing the shutter moved from the first position to a second position.
Figure 2:
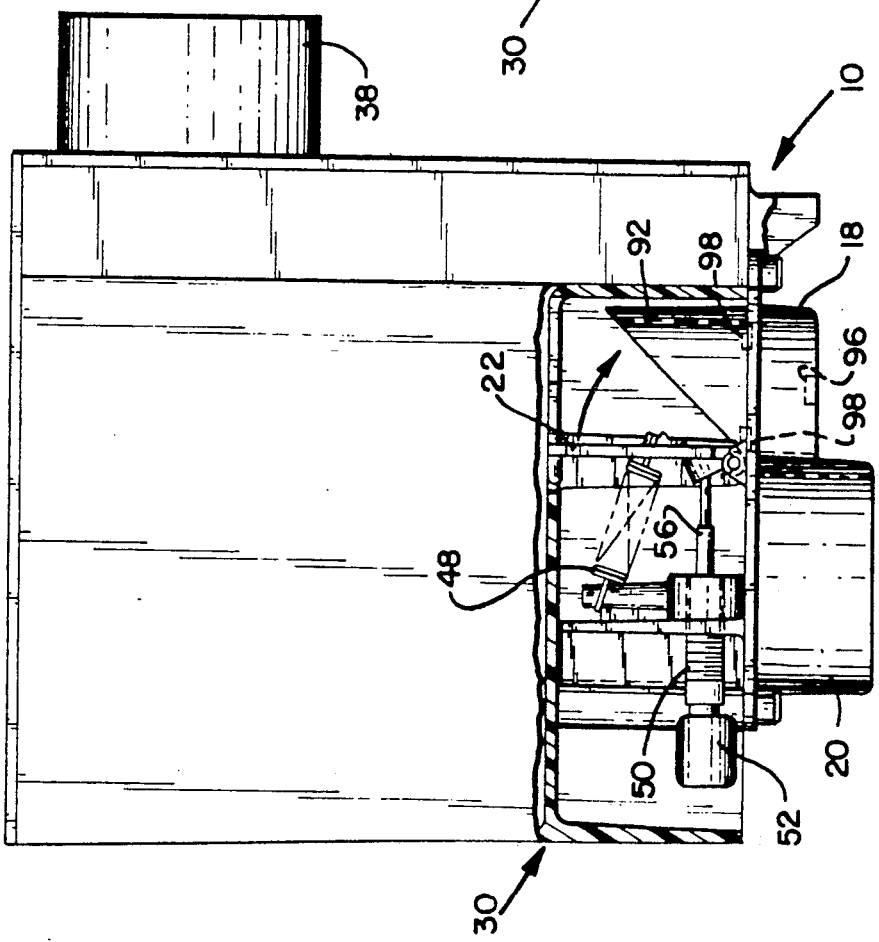
FIG. 2 is a top view of the air intake temperature regulator with a portion of the air filter housing removed and showing the shutter in a first position.

As shown in FIGS. 2 and 3, the shutter 22 is pivotally mounted to the housing 30 to move between two positions, a first position, as shown in FIG. 2, and a second position, as shown in FIG. 3. In the first position, the shutter 22 is positioned to open the preheated air inlet 18 and close the ambient air inlet 20. In the second position, the shutter 22 is positioned to close the preheated air inlet 18 and open the ambient air inlet 20. Through movement of the shutter, the temperature of the air supplied to the engine is regulated.

Proper movement of the shutter 22 is necessary to maximize engine performance as the ambient air temperature changes. If the air entering the engine is too cold, as would occur if the shutter 22 was in the position illustrated in FIG. 3 and the ambient air temperature became too cold, icing of the carburetor may occur causing the throttle to freeze into position and the fuel to not mix properly with the air. If the air entering the engine is too hot, as would occur if the shutter 22 was in the position illustrated in FIG. 2 and the ambient air temperature was sufficiently warm to prevent icing and permit proper mixing, the engine may lose power.

Figure 5:
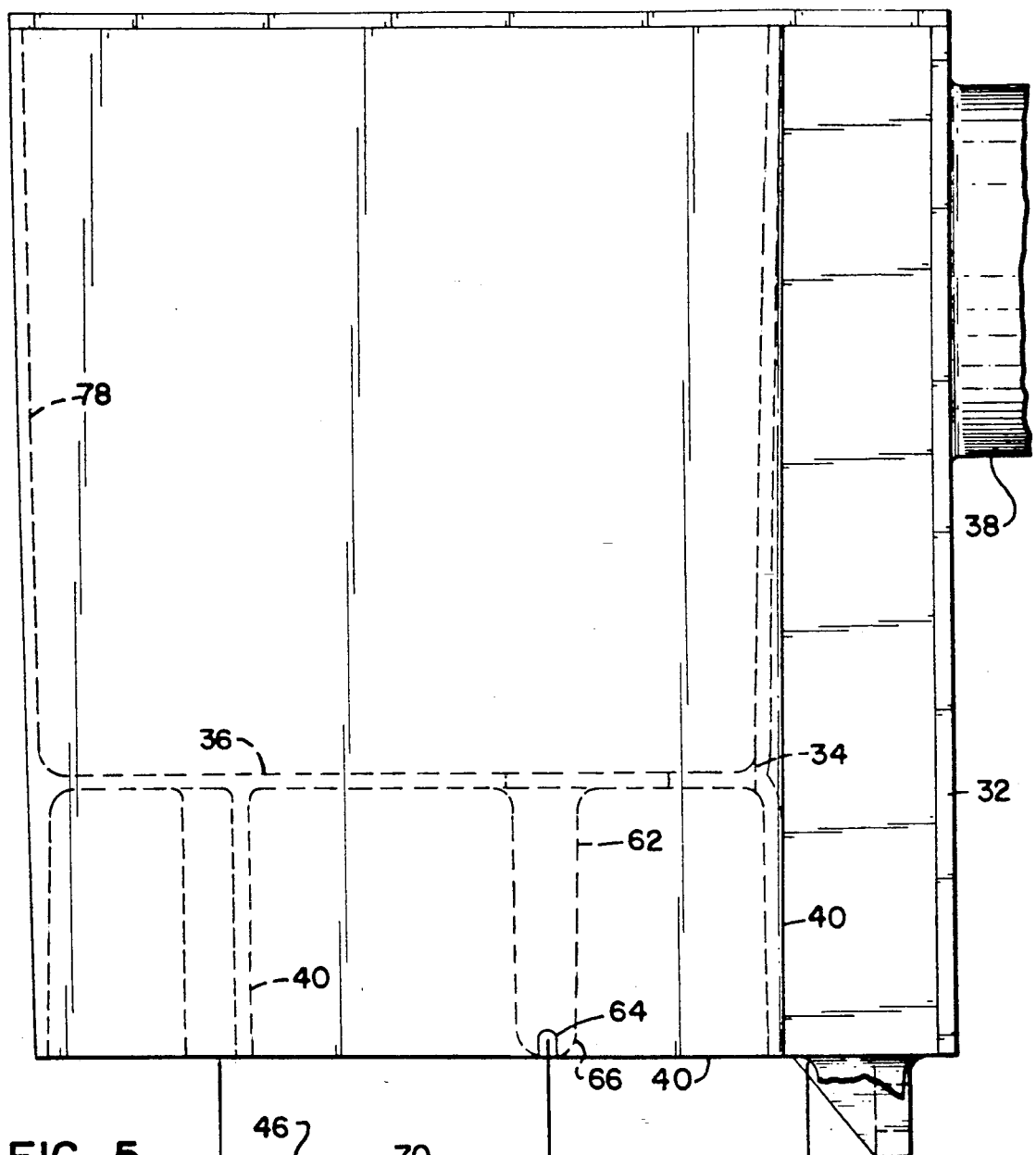
FIG. 5 is a further enlarged top view of the air intake temperature regulator shown in FIG. 2 with the regulator pulled away from the air filter housing and showing the shutter between the first and second position.

In the present invention, the shutter 22 is automatically moved between the first position, as shown in FIG. 2, and the second position, as shown in FIG. 3, by the cooperation of biasing structure, which includes a spring 48, and temperature sensing structure, which includes a wax pellet device 50. In FIG. 5, the shutter 22 is shown in a position intermediate the first and second position. In this intermediate position, the ambient air temperature is not so cold that the engine 12 requires all preheated air. With variable positioning of the shutter 22 between the first and second positions, the air intake temperature regulator 10 allows the ambient air to mix with the preheated air when the ambient air temperature is between the temperature extremes requiring either of the end positions of the shutter In the embodiment disclosed, as best shown in FIG. 5, the spring 48 is a helical coil spring attached to the housing 30 at one end and attached to the shutter 22 at the other end. The spring 48 biases the shutter toward the first position to open the preheated air inlet 18 as shown in FIG. 2. When the shutter 22 is moved to the second position as shown in FIG. 3, the spring 48 will act to return the shutter 22 toward the first position when the spring force is greater than the force applied to the shutter to move it from the first position toward the second position. It should be noted that various other kinds of springs could be employed to bias the shutter instead of the helical coil spring illustrated in the preferred embodiment.

The elongated wax pellet device 50 has a temperature sensing bulb 52 connected to a longitudinally movable stem 56 as best shown in FIG. 5. The stem 56 moves longitudinally as temperature sensed by the bulb changes. The bulb 52 contains wax which expands as the air surrounding the bulb increases in temperature, causing the stem 56 to extend longitudinally. Similarly, the wax in the bulb 52 contracts as the air temperature surrounding the bulb 52 decreases, causing the stem 56 to contract longitudinally. The wax pellet device 50 is mounted to the housing 30 such that the stem 56 engages the shutter 22 and urges the shutter 22 toward the second position as the temperature sensed by the bulb 52 increases. It should be noted that various other kinds of temperature sensing devices could be employed to engage the shutter instead of the wax pellet device illustrated in the preferred embodiment.

Figure 4:
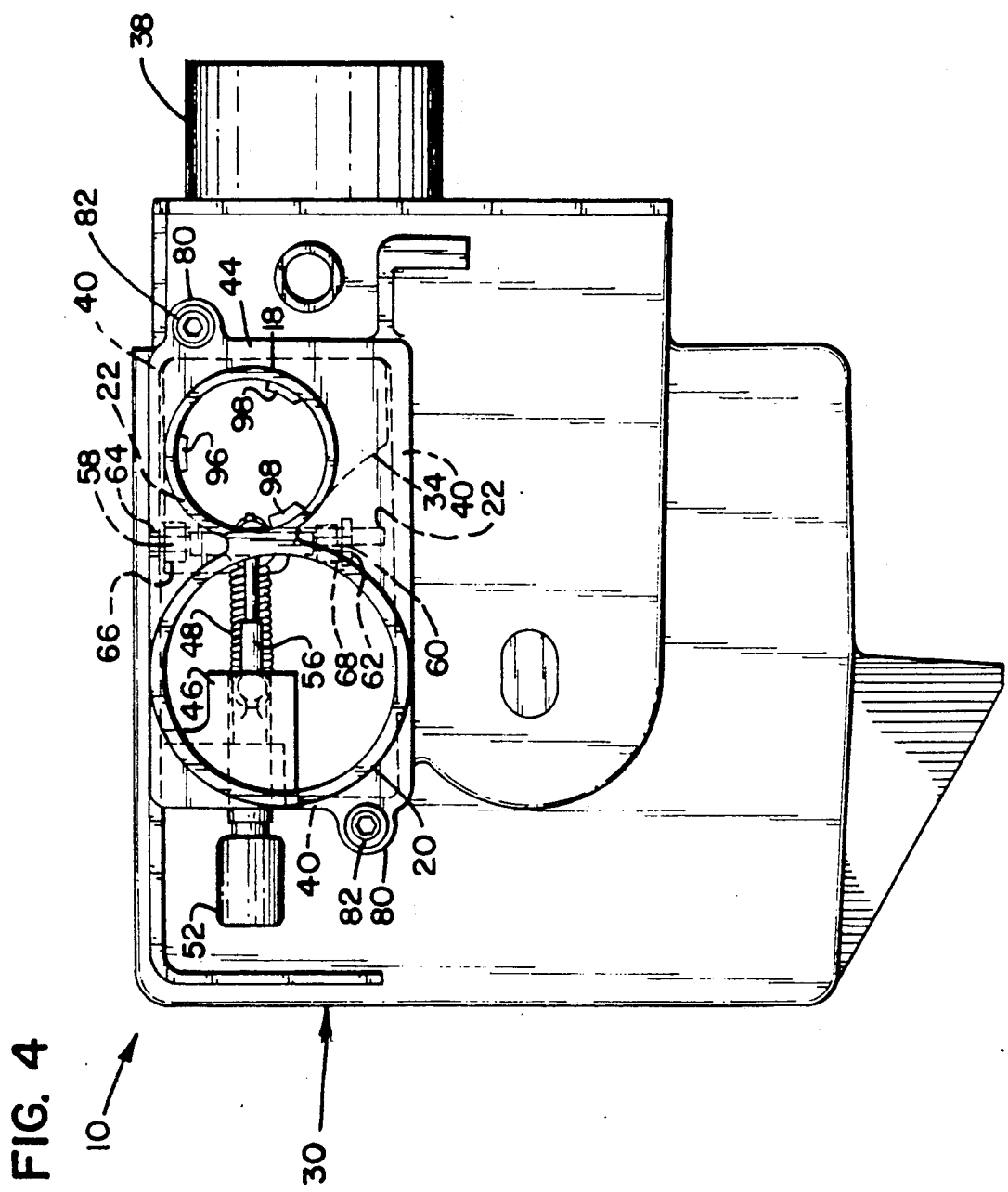
FIG. 4 is an enlarged side view of the air intake temperature regulator shown in FIG. 2.

In the embodiment shown, the housing 30 is formed from an air filter housing 32 and a preheater housing 42 as shown in FIG. 5. The air filter housing 32 has a box-shaped portion 78 that has an air inlet 34 entering into an interior of the air filter housing 32. The air outlet 38 links the interior of the air filter housing to the engine 12. The interior of the air filter housing 32 typically contains the air filter element for filtering the air flowing from the air inlet 34 to the air outlet 38. As shown in FIG. 4, the air inlet 34 of the air filter housing 32 passes through flat plate portion 36 of the air filter housing 32. An air filter housing extension 40 extends perpendicularly away from the plate portion 36 of the air filter housing 32 in an upstream direction as shown in FIGS. 4 and 5 so as to generally form the ceiling, floor, right wall, and part of the left wall of the preheater housing 42. The air filter housing extension 40 is adjacent to the air inlet 34 and substantially surrounds the air inlet.

As best shown in FIGS. 4 and 5, the preheater housing 42 has a plate 44 with an elongated plate extension 46 extending perpendicularly from the plate 44 in the downstream direction. The plate forms a downstream wall of the preheater housing 42 and its extension 46 forms par of the left wall. The preheated air inlet 18 and the ambient air inlet 20 pass perpendicularly through the plate 44. The preheater housing 42 is formed on the air filter housing 32 by threadably attaching the plate 44 to the air filter housing extension 40 by inserting mounting screws 82 through apertures in mounting tabs 80 located on diagonal corners of the plate 44 and threading the screws into threaded apertures on the air filter housing extension 40.

Once the preheater housing 42 is formed on the air filter housing 32, they cooperate to form a passageway linking the preheated air inlet 18 and the ambient air inlet 20 to the air inlet 34 of the air filter housing 32. The walls of the passageway are formed by the plate portion 36 of the air filter housing 32, the air filter housing extension 40, the plane , and the plate extension 46.

The shutter 22 is pivotally mounted to the plate 44 along an axis parallel to a major surface 24 of the shutter and adjacent an edge 84 of the shutter. Two shutter end posts 58, 60 are formed along the mounting axis of the shutter. Each shutter post snaps into ears 66, 68 mounted to the plate 44. A recess 64 in the air filter housing extension 40 cooperates with the top ear 66 to form a 360 degree bearing surface around the upper shutter post 58. An elongated shutter post holder 62 extends from the plate portion 36 of the air filter housing 32 and cooperates with the bottom ear 68 to form a 360 degree bearing surface around the lower shutter post 60. The 360 degree bearing surfaces help to maintain the shutter 22 mounted to the plate 44.

A tab 26 is formed in the major surface 24 of the shutter 22 near a center of the major surface for attaching the spring 48 to the shutter. The tab 26 is a u-shaped slit formed through the shutter 22 perpendicular to the major surface 24. One end of the spring 48 is looped around the tab to secure the spring to the shutter 22. The opposite end of the spring 48 loops around a post 70 formed on the plate extension 46.

As best shown in FIG. 5, the wax pellet device 50 is mounted to the preheater housing 42 through an aperture 86 in the plate extension 46 passing perpendicularly through the plate extension. The stem 56 engages a seat 28 formed on the shutter 22 located on the major surface 24 of the shutter between the tab 26 and the axis formed by the shutter posts 58, 60. The seat 28 has a spherical indentation that helps to prevent the tip of the stem 56 from moving parallel to the major surface 24 of the shutter 22 during elongation and contraction of the stem 56. The wax pellet device 50 has threads 54 about an exterior surface between the bulb 52 and the stem 56. The threads mate with an internally threaded insert 88 mounted in the aperture in the plate extension 46. Alternatively, the internal threads could be formed directly in the plate extension 46. The wax pellet device 50 is initially calibrated by rotating the wax pellet device relative to the plate extension.

In the preferred embodiment, the wax pellet device 50 is mounted to the housing 30 such that the bulb 52 is located on an exterior of the preheater housing 42 and the air filter housing 32 and the stem 56 extends into the interior of the preheater housing 42. As is shown in FIGS. 2, 3, and 4, the bulb 52 is exposed to the ambient air on an exterior of the housing 30. Longitudinal movement of the stem 56 and the corresponding movement of the shutter 22 is dependant only upon the ambient air temperature surrounding the regulator 10. With this configuration, movement of the shutter 22 is not a function of the temperature of the preheated air, nor is it a function of the temperature of the air downstream of the preheated air inlet 18 and ambient air inlet 20. Furthermore, no complex linkage is required to link the wax pellet device 50 to the shutter 22.

The regulator 10 shown locates all the moving parts, including the shutter 22, the spring 48, and the stem 56 of the wax pellet device 50 in the interior of the preheater housing 42. Not only does this present a more aesthetically pleasing regulator, but more importantly it protects the parts from damage and contamination. However, it is possible to regulate movement of the shutter with a spring mounted externally of the regulator and the wax pellet device mounted externally of the regulator.

As best seen in FIG. 4, the ambient air inlet 20 and the preheated air inlet 18 are both circular in shape at the point where they pass through the plate 44. The ambient air inlet 20 has an ambient air inlet extension 90 which extends perpendicularly upstream from the plate 44 as best seen in FIG. 5. The ambient air inlet extension 90 extends beyond the preheated air inlet 18 to provide an outer mounting surface 94 engagable with an interior of a hose 72. The hose can be added as an optional attachment when the ambient air adjacent the ambient air inlet 20 contains excessive contaminants. The hose can be added to permit cleaner ambient air to be drawn from an area that is not as contaminated as the area surrounding the ambient air inlet. It will be appreciated that the ambient air inlet 20 is not limited to any particular dimension and can be sized for use with existing hoses.

As best shown in FIGS. 4 and 5, the preheated air inlet 18 has an inwardly projecting tooth 96 for engaging the outer surface of a tubing 74 to retain the tubing in the preheated air inlet. The tubing links the preheated air inlet 18 to the source of preheated air which is typically air heated by the exhaust manifold of the engine. Inwardly projecting stops 98 prevent insertion of the tubing 74 too far into the preheated air inlet 18 such that the tubing would interfere with the operation of the shutter 22. It will be appreciated that the preheated air inlet is not limited to any particular dimension and can be sized for use with existing tubing.

The preheated air inlet 18, as best shown in FIGS. 3 and 4, has a preheated air inlet extension 92 angled to reduce the amount of travel of the shutter 22 between the first position and the second position. The major surface 24 of the shutter 22 has a diameter larger than a diameter of an end of the preheated air inlet extension 92. When the shutter 22 is in the second position as shown in FIGS. 3, the preheated air flow is at a minimum. As shown in FIGS. 2 and 4, the shutter 22 also cooperates with the inner surfaces of the passageway in the preheater housing 42 to reduce the ambient air flow to a minimum when the shutter is moved to the first position. The major surface 24 of the shutter 22 has an outer perimeter slightly smaller than the inner surfaces of the passageway in the preheater housing 42 to permit pivoting of the shutter while reducing the ambient air flow to a minimum when the shutter is in the first position.

The main parts of the regulator 10 including the air filter housing 32, the preheater housing 42, and the shutter 22 but excluding the spring 48, the wax pellet device 50, and the threaded insert 88, can be made from molded plastic. As best illustrated in FIG. 5, it is intended that the shutter 22, the wax pellet device 50, the spring 48, and the internally threaded boss 88 be mounted to the plate 44 before the plate is mounted to the air filter housing 32 so as to form the preheater housing 42. Because these parts can be assembled on the plate 44, the regulator can be readily replaced should a part be broken or require replacement.

In operation the wax pellet device 50 and the spring 48 cooperate to position the shutter 22 between the end positions shown in FIGS. 2 and 3 as the ambient temperature varies. When the ambient air temperature surrounding the bulb 52 of the wax pellet device 50 increases, the wax will expand and the stem 56 will extend longitudinally to move the shutter 22 in a direction from the first position as shown in FIG. 2 toward the second position as shown in FIG. 3. As the ambient air temperature decreases, the wax will contract and the stem 56 will retract longitudinally with the assistance of the spring 48 permitting the spring 48 to pull the shutter 22 in a direction away from the second position as shown in FIG. 3 toward the first position as shown in FIG. 2. In this manner, the air intake temperature regulator 10 will automatically regulate the amounts of ambient air and preheated air entering the engine 12 based on the ambient temperature sensed.

The following example illustrates the manner in which the air intake temperature regulator 10 of the present invention may be employed with a generator set 16 to regulate the air intake temperature such that the engine 12 performs properly in cold ambients. One type of generator set that may be used has a 2-cylinder, horizontally opposed, air-cooled, gasoline carburetor engine which powers a generator to generate 5000 watts at 1800 rpm governed speed. This particular generator set functions properly when all preheated air is supplied to the engine when the ambient air temperature is below 40 degrees Fahrenheit. The generator set functions properly when no preheated air is supplied to the engine when the ambient air temperature is above 100 degrees Fahrenheit. At 40 degrees ambient the shutter 22 will be in the first position, and at 100 degrees ambient the shutter 22 will be in the second position. As the ambient air temperature varies between 40 degrees and 100 degrees, the shutter 22 will rotate linearly between the first position and the second position. It should be noted that the operating temperature range for the engine 12 described above can be translated up or down or made broader or narrower depending upon the requirements of the particular generator set employed with the air intake temperature regulator of the present invention.

In the preferred embodiment, the bulb 52 of the wax pellet device 50 senses only ambient air temperature. As a result, the shutter 22 will move when the ambient air temperature surrounding the bulb changes. However, because the bulb 52 is located in the engine compartment, the shutter position may be influenced by any increase in air temperature in the engine compartment that often occurs after start up of the engine. Typically, the engine may raise the air temperature in the engine compartment only slightly as the engine goes from cold start conditions to running conditions.

The automatic air intake temperature regulator 10 of the present invention is particularly useful with generator sets of the type commonly used on recreational vehicles, ambulances, and other vehicles as auxiliary sources of electricity. Typically, generator sets used in those settings are small and often must fit into small areas on the vehicles. The regulator in this case has a sufficiently small size such that it is ideally suited for use with those types of generator sets.

While it is anticipated that the automatic air intake temperature regulator 10 of the present invention is primarily designed for use with a small generator set as described above, the regulator could be used with other engines that require regulation of air intake temperature. In particular, the regulator could be employed with a vehicle engine if the regulator component parts were sized and calibrated for the particular engine requirements of the vehicle engine.

It is to be understood, that even though numerous characteristics and advantages of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

I claim:

1. An automatic air intake temperature regulator for regulating the temperature of air entering an internal combustion engine, comprising:
   a housing having an ambient air inlet to an interior of the housing connectable to a source of ambient air, the housing further having a preheated air inlet to the interior of the housing connectable to a source of preheated air, and the housing further having an air outlet from the interior of the housing to the engine;
   a shutter pivotally mounted to the housing movable between two positions wherein the shutter closes the ambient air inlet and opens the preheated air inlet in a first position and the shutter closes the preheated air inlet and opens the ambient air inlet in a second position;
   biasing means for biasing the shutter toward the first position to open the preheated air inlet; and
   temperature responsive means for only sensing temperature of the ambient air on the exterior of the housing and urging the shutter toward the second position to open the ambient air inlet as the ambient air temperature increases, the temperature responsive means including temperature sensing means located external of the ambient and preheated air inlets on the exterior of the housing for sensing the temperature of the ambient air on the exterior of the housing.

2. The automatic air intake temperature regulator of claim 1, wherein the shutter is variably positionable between the first position and the second position.

3. The automatic air intake temperature regulator of claim 1, wherein the biasing means includes a spring attached to the housing and attached to the shutter.

4. The automatic air intake temperature regulator of claim 1, wherein the shutter is mounted to the housing along an axis parallel to a major surface or the shutter.

5. The automatic air intake temperature regulator of claim 4, wherein the shutter mounting axis is adjacent an edge of the shutter.

6. The automatic air intake temperature regulator of claim 1, wherein the temperature responsive means includes a wax pellet device having a temperature sensing bulb and a longitudinally moveable stem having movement corresponding to changes in temperature sensed by the bulb.

7. The automatic air intake temperature regulator of claim 6, wherein the bulb of the wax pellet device is on an exterior of the housing and the stem extends into the interior of the housing.

8. The automatic air intake temperature regulator of claim 1, wherein the housing includes an air filter housing and a preheater housing, the air filter housing including an air inlet providing a passageway from an interior of the preheater housing to an interior of the air filter housing, the air outlet providing a passageway from the interior of the air filter housing to the engine, the preheater housing including the preheated air inlet and the ambient air inlet.

9. The automatic air intake temperature regulator of claim 8, wherein the temperature responsive means includes a wax pellet device having a temperature sensing bulb and a longitudinally movable stem having movement corresponding to temperature changes sensed by the bulb, the wax pellet device mounted to the preheater housing wherein the bulb is located o the exterior of the housing and the stem extends into the interior of the preheater housing.

10. The automatic air intake temperature regulator of claim 8, wherein the preheated air inlet and the ambient air inlet are mounted on a plate of the preheater housing.

11. An air flow regulating device mountable to an engine for regulating temperature of the air entering the engine; the engine being provided with a preheated air inlet attachable to a source of preheated air and an ambient air inlet attachable to a source of ambient air; and air flow regulating device comprising:
    a shutter pivotally mountable to the engine movable between two positions wherein the shutter closes the ambient air inlet and opens the preheated air inlet in a first position and closes the preheated air inlet and opens the ambient air inlet in a second position;
    biasing means biasing the shutter towards the ambient air inlet; and
    temperature responsive means responsive only to ambient air temperature for urging the shutter toward the preheated air inlet as ambient temperature increases, the temperature responsive means including temperature sensing means located external of the preheated air inlet and the ambient air inlet on an exterior of the engine of r sensing the ambient air temperature on the exterior of the engine.

12. The airflow regulating device of claim 11, wherein the shutter is variably positionable between the first position and the second position.

13. The airflow regulating device of claim 11, wherein the shutter is mounted to the engine along an axis parallel to a major surface of the shutter and adjacent an edge of the shutter, the biasing means including a spring attached at one end to the engine and at the opposite end to the major surface of the shutter, the temperature responsive means including a wax pellet device having a temperature sensing bulb on an exterior of the engine and a longitudinally movable stem having movement corresponding to temperature changes sensed by the bulb, the stem extending into an interior of the engine, the stem engaging the major surface of the shutter.

14. An automatic air intake regulator assembly mountable to an air filter assembly, the air filter assembly having an air inlet and an air outlet; the regulator assembly comprising:

a plate mountable to the air filter assembly, the plate having a preheated air inlet attachable to a source of preheated air and an ambient air inlet attachable to a source of ambient air, the plate cooperating with the air filter assembly to form a passageway connecting the preheated air inlet and the ambient air inlet to the air inlet of the air filter assembly;

a shutter pivotally mounted to the plate, the shutter closing the ambient air inlet and opening the preheated air inlet in a first position and closing the preheated air inlet and opening the the ambient air inlet in a second position;

biasing means mounted on the plate for biasing the shutter toward the first position; and temperature responsive means mounted on the plate for urging the shutter toward the second position as ambient temperature increases.

15. The regulator assembly of claim 14, wherein the plate has an extension extending from the plate, the plate and the plate extension cooperating with the air filter assembly to form the passageway.

16. The regulator assembly of claim 15, wherein the temperature responsive means includes a wax pellet device having a temperature sensing bulb and a longitudinally movable stem having movement corresponding to changes in temperature sensed by the bulb; the wax pellet device mounted to the plate extension wherein the bulb is on an exterior of the passageway and the stem extends into the passageway.

17. The regulator assembly of claim 14, wherein the shutter is variably positionable between the first positron and the second position.

18. The preheater assembly of claim 14, wherein the shutter is a one piece molded plastic part.

19. The preheater assembly of claim 14, wherein the shutter is mounted to the plate along an axis parallel to a major surface of the shutter and adjacent an edge of the shutter; and the biasing means including a spring attached at one end to the plate and at an opposite end to the major surface of the shutter, the temperature responsive means including a temperature sensing bulb and a longitudinally movable stem having movement corresponding to temperature changes sensed by the bulb, the stem engaging the major surface of the shutter.

20. A method for regulating temperature of air entering an internal combustion engine comprising:

providing a source of ambient air through an ambient air inlet to an interior of an engine;

providing a source of preheated air through a preheated air inlet to the interior of the engine;

sensing the temperature of the ambient air exterior of the ambient air inlet; and positioning a shutter to control air flow to the engine from the ambient air source and from the preheated air source based only on the ambient air temperature sensed.

21. An air flow regulating device mountable to an engine for regulating temperature of the air entering the engine; the engine being provided with a preheated air inlet attachable to a source of preheated air and an ambient air inlet attachable to a source of ambient air; the air flow regulating device comprising:

a shutter pivotally mountable to the engine movable between two positions wherein the shutter closes the ambient air inlet and opens the preheated air inlet in a first position and closes the preheated air inlet and opens the ambient air inlet in a second position; and temperature responsive means responsive only to ambient air temperature for urging the shutter toward the preheats air inlet as ambient temperature increases and for urging the shutter toward the ambient air inlet as ambient air temperature decreases, the temperature responsive means including temperature sensing means located external of the preheated air inlet and the ambient air inlet on an exterior of the engine for sensing the ambient air temperature on the exterior of the engine.

22. An automatic air intake regulator assembly mountable to an air filter assembly, the air filter assembly having an air inlet and an air outlet; the regulator assembly comprising:

a plate mountable to the air filter assembly, the plate having a preheated air inlet attachable to a source of preheated air and an ambient air inlet attachable to a source of ambient air, the plate cooperating with the air filter assembly to form a passageway connecting the preheated air inlet and the ambient air inlet to the air inlet of the air filer assembly;

a shutter pivotally mounted to the plate, the shutter closing the ambient air inlet and opening the preheated air inlet in a first position and closing the preheated air inlet and opening he ambient air inlet in a second position; and temperature responsive means mounted on the plate for urging the shutter toward the second position as ambient temperature increases and for urging the shutter toward the first position as ambient temperature decreases.

* * * * *

UNITED STATES PATENT AND TRADEMARK OFFICE
CERTIFICATE OF CORRECTION

PATENT NO. : 5,046,473

DATED : September 10, 1991

INVENTOR(S) : Hokenson

It is certified that error appears in the above-identified patent and that said Letters Patent is hereby corrected as shown below:

Column 1, line 57
 DELETE "t e" and INSERT therefor --the--.

Column 2, line 37
 DELETE "." after the word "inlet".

Column 3, line 15
 INSERT --a-- after the word "described".

Column 3, line 54
 DELETE "supplied" and INSERT therefor --supplies--

Column 3, line 62
 INSERT --is-- after the word "which".

Column 3, line 65
 DELETE "move e" and INSERT therefor --movable--.

Column 4, line 37
 DELETE "form the air output" and INSERT therefor --from the air outlet--.

Column 5, line 63
 INSERT --a-- after the word "through".

Column 6, line 9
 DELETE "par" and INSERT therefor --part--.

Column 6, line 24
 DELETE "plane" and INSERT therefor --plate 44,--.

UNITED STATES PATENT AND TRADEMARK OFFICE
CERTIFICATE OF CORRECTION

PATENT NO.   :   5,046,473                              Page 2 of 2
DATED        :   September 10, 1991
INVENTOR(S)  :   Hokenson It is certified that error appears in the above-identified patent and that said Letters Patent is hereby corrected as shown below:

Column 8, line 9
    DELETE "boss" and INSERT therefor --insert--.

Column 10, line 29 (claim 9)
    DELETE "o" and INSERT therefor --on--.

Column 10, line 56 (claim 11)
    DELETE "of r" and INSERT therefor --for--.

Column 12, line 27 (claim 21)
    DELETE "preheats" and INSERT therefor
    --preheated--.

Column 12, line 49 (claim 22)
    DELETE "he" and INSERT therefor --the--.

Column 4, line 32
    DELETE "output" and INSERT therefor --outlet--.

Column 4, line 32
    DELETE "exists" and INSERT therefor --exits--.

Signed and Sealed this

Ninth Day of November, 1993

Attest:

BRUCE LEHMAN

*Attesting Officer*    *Commissioner of Patents and Trademarks*